INVENTOR

MASAHIDE YAZAWA

BY Craig, Antonelli & Hill

ATTORNEYS 3,739,053
METHOD FOR FIBRILLATING STRETCHED FILM
Masahide Yazawa, Tokyo, Japan, assignor to Polymer Processing Research Institute, Ltd., Tokyo, Japan
Application Apr. 23, 1969, Ser. No. 818,529, which is a continuation-in-part of application Ser. No. 510,546, Nov. 30, 1965, which in turn is a continuation-in-part of application Ser. No. 569,714, Aug. 2, 1966. Divided and this application Sept. 17, 1971, Ser. No. 181,329
Claims priority, application Japan, June 5, 1965, 40/33,241; Apr. 14, 1966, 41/23,966
Int. Cl. D01d 5/22
U.S. Cl. 264—154                                   6 Claims

ABSTRACT OF THE DISCLOSURE

The present disclosure is directed to a method and apparatus for manufacturing split-fibers from a uniaxially oriented film obtained from a fiber-forming polymer which comprises slide-rubbing at least one side of the oriented film in the oriented direction under an effective longitudinal tension on at least one rough surface rotating at a peripheral speed different from that of the running speed of the film and having many tiny and rigid projections thereon, said film contacting, in succession, a plurality of said rigid projections which do not pierce the film, thereby fibrillating the film into many fibrils as a result of the shearing stress between film portions passing along the projected portions of the rotating rough surface and those portions passing along the recessed portions of the rotating surface.

---

This is a division of application Ser. No. 818,529 filed Apr. 23, 1969 now Pat. No. 3,693,851, which is a continuation-in-part of application Ser. No. 510,546, filed on Nov. 30, 1965, and application Ser. No. 569,714, filed on Aug. 2, 1966 both now abandoned.

The present invention relates to a method and apparatus for manufacturing split fibers from an oriented film. More particularly, the present invention is directed to a method and apparatus for manufacturing split fibers from a uniaxially oriented film wherein at least one surface of said film is slide-rubbed in the orientation direction of the film, under tension, over a surface having many tiny and rigid projections thereon. The present invention is also concerned with a method and apparatus for manufacturing crimped split fibers from a uniaxially oriented film, which can be used, for example, for making bulky clothing, or carpet surface fabric.

One of the conventional methods for making split fibers from an oriented film is described in Japanese Pat. No. 239,708/1957. In this method sliding frictional force is repeatedly applied to a film in the direction perpendicular to the stretching and orientation direction of the film, thereby splitting the film into many fibers in a direction parallel to said stretching direction. U.S. Pat. No. 2,954,-587 (1960) by Rusmussen also discloses a very similar method employing a physical force in a direction perpendicular to the stretching and orientation direction of uniaxially oriented film.

These methods make full use of the nature of an oriented film in that uniaxial stretching increases the strength of the film in the direction of said stretching but decreases the strength of the film in the direction perpendicular to said stretching (i.e. orientation) direction of the film. In these methods, a sliding frictional force or other physical force is applied to the oriented film in the weaker direction to aid the splitting of the film into many fibers.

However, in order to apply an appropriate physical force to the oriented film in the direction perpendicular to the stretching and orientation direction of the film, it is necessary to employ a relatively large size apparatus having a complicated structure. Furthermore, the processing speed of the film with such an apparatus is usually so slow that a more practical and economical method and apparatus have been long desired.

Another approach utilized in the manufacture of split fibers from an oriented film is described in Japanese patent publication No. 5,819/1962 and in U.S. Pat. No. 2,853,741. In these methods the film is pierced through by the bristles of a wire brush or cloth while the film is moved in the same direction as the orientation direction of the film, thereby splitting said film with said bristles into many fibers. Through investigations, it has been found that the fibers obtained by these splitting methods have properties such as the width of each fiber is almost the same as the transverse pitch between each bristle, the length of the fiber is determined by the piercing duration which is established by the relative velocity of the film and rotating bristles, and the net-structure of the fibers is defined by the arrangement of the bristles. However, such methods have serious drawbacks in that the split fibers generally have coarse deniers and tend to coil around the rotating bristles at the start-up of the operation or if there is a relaxation in the tension of the tape during the process. More specifically, naps of the fibers always coil around the bristles, thereby making these methods undesirable for the production of split fibers on an industrial scale.

An object of the present invention is to avoid the prior art disadvantages in processes and apparatus for fibrillating an oriented film.

Another object of the present invention is to provide a new method and apparatus for manufacturing split fibers having a net-work structure, from an oriented film.

A further object of the present invention is to provide an improved method and apparatus for manufacturing crimped split fibers from a uniaxially oriented film.

Still another object of the present invention is to provide a product which is produced by the method and apparatus as defined herein.

A still further object of the present invention is to provide an improved method and apparatus for manufacturing split fibers from an oriented film which are suitable for making attractive bulky clothing, or carpet face yarn.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved method and apparatus for fibrillating a uniaxially oriented film into a split fiber network may be obtained by slide-rubbing in the orientation direction of the film at least one surface of said film, under tension, over a surface having many tiny and rigid projections thereon. According to the present invention, the same portion of the film is repeatedly contacted with successive projections which eventually fibrillate the film into a fiber product having a random, branched, netlike structure. The product thus produced has good properties as fibers, if relaxed-annealed as usual artificial fibers are done. Thus, the tiny and rigid projections do not pierce through the film and are not able to fibrillate the film by a single contact of said projections with the film in the course of said slide-rubbing, but rather it is the repeated contact of the same portion of said film with the tiny and rigid projections which eventually fibrillates the film into a network of fibrils.

More specifically, in accordance with the present invention, it has been found that when a uniaxially oriented film is progressively slide-rubbed, under tension, in the orientation direction of the film over a rough rotating surface, such as for example, a file or other surface having many tiny and rigid projections thereon which do not pierce through the film and are not able to fibrillate or split the film by contacting a single projection among said many projections on the film only once in the course of said slide-rubbing, a number of shallow streaks at first appear on the slide-rubbed surface of the film by the first contact of the projections with said film. This is immediately followed by successive slide-rubbing of the film with subsequent rows of projections as the film traverses a predetermined surface area of the rubbed surface which contains many rows of said projections. Accordingly, the film is fibrillated into many fibrils in a direction parallel to the orientation direction of the film due to the uneven tension existing in the film contacting the rough surface, as will be explained later. The oriented film is slide-rubbed over the rough rotating surface with a contact angle of less than 180°, say about 50 to 120°. The contact angle as defined by the present invention is that angle between the feed in and exit paths of the film on the rough surface.

The fibrillation method of the present invention does not require any external force in the direction perpendicular to the stretching and orientation direction of the film as is necessitated in the conventional methods. In the method of the present invention, it is thought that when an oriented film is slide-rubbed over a surface containing many tiny and rigid projections, for example a file, the uneven surface of the file may produce corresponding uneven tension in the film. That is, in each portion in contact with the projections of the file, higher tension may be produced than in the portions moving over the recessed part of the file. Since there are many small projections on the file, the tension distortion produced in the film cannot be compensated for transveresly, and this is believed to cause a kind of shearing stress between the portions of the film in contact with the projections of the file and the adjoining portions of the film passing over the recesses of the file with the result that the film is fibrillated along boundary lines between the former portions of the file and the latter ones, mainly parallel to the orientation direction of the film.

When a round bar file having a diagonally patterned mesh is used as the rough surface, and an oriented film is slide-rubbed under tension over the rough surface in the same direction as the orientation direction of the film, the film in contact with projections at one moment will be in contact with the recesses of the file the next moment. Therefore, when appropriate tension is employed, the split fibers thus produced by the method and apparatus of the present invention will be a network structure of accidental, irregular length. However, if the tension applied is too low, the splitting of the film will be inadequate, and if the tension is excessively high, the split fibers may be easily cut off.

The appropriate stretching tension for fibrillating the film depends on such factors as the properties of the oriented film to be used, that is, the kind of polymer from which the film is to be made, the degree of orientation, the thickness of the polymer, its strength or tenacity, the breaking elongation of the film, the type of product desired, and the like. The appropriate tension frequently lies between about 1.0 to 1.5 grams per denier, which is established in the usual manner, that is, by the speed difference between the peripheral speeds of the feeding-in and taking-up pinch rollers. The speed difference also changes in accordance with the breaking elongation of the film and should be a value which corresponds to about ⅕–⅓ of the value of the breaking elongation of the film to be used. For example, in the case of a polypropylene film stretched about 9 to 10 times its original length and having a breaking elongation of about 10 to 15%, the appropriate said speed difference is about 3 to 5% and in the case of an oriented film having a breaking elongation of more than 25%, said speed difference will be about 10%. Accordingly, the speed difference is selected by experimentation, depending on the properties of the oriented film and the desired product.

Satisfactory results may be obtained by slide-rubbing only one surface of the film over a rough surface, however, two or more rough surfaces may be employed so as to contact both sides of the film simultaneously, if desired.

When a round bar file is employed, the film may be passed over the file from a direction perpendicular to the length of said bar file. Since use of a rotating round bar file has been found practical for fibrillating fibers from an oriented film on an industrial scale, the present invention shall be more specifically described hereinbelow with respect to such a rotating round bar file. Ordinarily, the denier of split fiber becomes smaller in proportion to the increase in the peripheral speed of the rotating round bar file. However, if the peripheral speed of the file becomes excessively high, the network of the split fibers tend to rupture resulting in undesirable nappy split fibers. When the peripheral speed of the rotating bar file is about 1.5 to 5 times higher than the running speed of the film in order to get a relative speed difference of 100 m. to 400 m. per minute between the two, the finest split fibers obtainable with the employed mesh size of the file may be produced. However, when the diameter of a round rough surface is increased, it is necessary to reduce the ratio of peripheral speed of the rough surface to the running speed of the film and also to regulate the contact angle of the film on said rough surface. Some of the important factors include the relative speed difference of the rough surface against the film and the contact angle. These factors vary the number of projections on the rough surface which contact a definite portion of the film surface and the most important factor is the very number of said projections which contact said definite portion of the film surface. Of course, another consideration is the coarseness of said rough surface. In general, the coarseness of the file mesh must be increased in proportion to the increase in diameter of the file. Thickness of the film is also an important factor in determining the file mesh and in general, the coarseness of the file mesh must be increased in proportion to the increase in the thickness of the film. Thus, the mesh size of the employed file must be selected appropriately depending on the diameter of the file, the thickness of the film, the running speed of the film, the rotational speed of the file and the desired denier of the product.

The running speed of the oriented film may be widely varied depending upon the rough surface employed, the desired product and many other factors. However, in most cases, efficient fibrillating of the oriented film into fibers may be accomplished using a single rotating round bar, if the film is moving at a rate of more than about 100 meters per minute. For example, an oriented film can be sufficiently fibrillated at a speed more than 300 meters per minute with use of a single rotating rough surface of this invention having a diameter more than 50 millimeters.

As already described above, in the present invention an oriented film may be slide-rubbed over a plurality of rough surfaces arranged in series. In the present case, the rough surfaces are rotatable and may be arranged so as to contact one or both sides of the film. Alternatively, a number of rough surfaces, each being freely rotatable around its own axis, may be assembled in the form of a cage roller which also rotates around its own axis.

In accordance with another feature of the present invention, it has been found that a very good crimp, which is one of the properties most desired in garment fiber or carpet surface yarn, may be readily given to the fibrillated fibers of the present invention by merely employing a certain pretreatment of the raw film to be fed into the apparatus. According to the present invention, it has been found that a crimped split or fibrillated fiber can be readily prepared from an oriented film by giving each side of the film a different thermal contraction property, slide-rubbing the film surface of higher thermal contraction property under tension, in the orientation direction of the film, over a rough rotating surface and heat-treating the thus obtained split or fibrillated fibers.

Hitherto, various methods have been proposed to crimp man-made fibers. For example, in a viscose man-made fiber, it is known that if a coagulation bath is applied to a spun viscose filament from a direction perpendicular to the running direction of the filament, under tension, since the coagulation speed differs on respective sides of the filament, a better molecular orientation may be obtained on the part of the filament directly facing the coagulation bath and hence a good crimp may be obtained by treating such coagulated filament with hot water. When a melt spinning process is being conducted, such an asymmetrical solidification may be given to the filament by applying a cold air stream in place of the above-said coagulation bath.

It has also been known that a good crimping can be given to a conjugated filament by extruding two different types of polymers, each having a different thermal contraction property, through a single nozzle and heat-treating the thus extruded conjugated filament.

However, contrary to expectation, it has been found that such a conventional method cannot directly be applied to the fibrillation method of the present invention. That is, in obtaining a crimped, split fiber by the method of the present invention, mere employment of an oriented film having a different thermal contraction property on each side of the film has been proven to be inadequate or less crimped and an important factor in obtaining a good crimp is that the film surface having the higher thermal contraction property is in contact with the rotating rough surface.

This particular concept might be explained as follows: When an oriented film is slide-rubbed over a rough surface under tension in the same direction as the orientation of the film, the molecular orientation in the film surface in contact with the rough surface tends to be improved due to the generated frictional heat and the slide-rubbing motion. Therefore, if the film surface having a higher thermal contraction property, that is, a better molecular orientation, is slide-rubbed over the file, the difference in extent of molecular orientation between the two surfaces of the film must be magnified up to a level sufficient to result in good crimping when the produced split fiber is heated. To the contrary, if the film surface having a lesser thermal contraction is slide-rubber over the file, the difference in the molecular orientation between the respective surfaces may be very small, that is, may be leveled off and hence a desired crimping cannot be obtained as a result thereof. Thus, according to the present invention, any conventional process which produces a different thermal contraction property on each surface of the film may be effectively employed. For example, in the case of using a circular dye in the so-called inflation method, the extruded and blown tubular film is quickly cooled, under tension, by applying cold air to the outer surface of the film, the outer surface and the inner surface of the film thereby being solidified in each different duration of time.

The thus prepared film is then cut in an appropriate size, uniaxially oriented and then subjected to the present method, that is, slide-rubbing its higher orientation surface to fibrillate the film into fibrils, and heated to make the objective crimped split fiber. Of course, it is possible to change the order of said orientation step and the process for producing a different thermal contraction property on each side of the film. For example, a film is first oriented uniaxially and then one surface of the film is abraded over a heated sharp edge under tension without splitting, thereby producing a good molecular orientation in the contacted surface, and finally said highly oriented surface is slide-rubber over a rough surface to fibrillate the film into many fibrils.

The present invention will become more fully understood from the detailed description given hereinbelow and the accompanying drawings which are given by way of illustration only and thus are not limitative of the present invention and wherein, FIG. 1 is a schematic illustration of the apparatus employed in the present invention wherein a single bar file is used as the rough surface;

Figure 1:
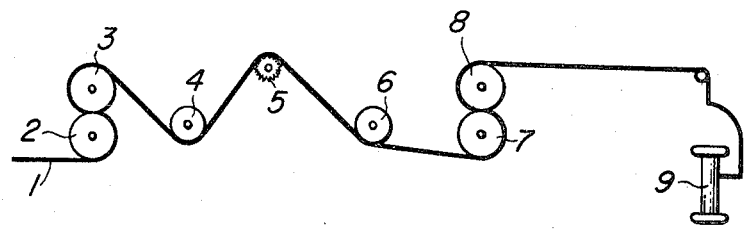

Referring now to the drawings, wherein like reference numerals are used throughout the various views to designate like parts, the apparatus of the present invention as shown in FIG. 1 comprises an oriented film 1 supplied to a pair of feed pinch rollers 2 and 3, the surface of said rollers being covered with rubber. The oriented film is then sent to a bar file 5 via turn roller 4 and then taken up by the exit pinch rollers 7 and 8 via turn roller 6. One of the exit pinch rollers is made of metal and the other is made of rubber. The film is slide-rubbed over the curved surface of the round bar file 5 at an appropriate contact angle which is regulated by the position of turn rollers 4 and 6 located in front of and behind the bar file 5. The fibrillated fibers are then taken up by the exit pinch rollers 7 and 8. An appropriate tension is given to the film by adjusting the peripheral velocity ratio of the inlet pinch rollers to the exit pinch rollers. The fibrillated fibers are then wound up on bobbin 9 perferably after relax-annealed (not shown) in an untwisted or twisted state.

Alternately, a plurality of bar files may be arranged in series with a number of intermediate turn rollers, and an oriented film is conveyed over these bar files so that the film may be repeatedly slide-rubbed. Of course, it is also possible to provide an arrangement wherein a plurality of film tapes can be simultaneously passed in parallel over a single bar file, each group of the fibrillated fibers being wound up on a separate bobbin. FIG. 1 shows the fibrillated fibers being wound up on the bobbin 9 by a conventional spindle means.

Figure 2:
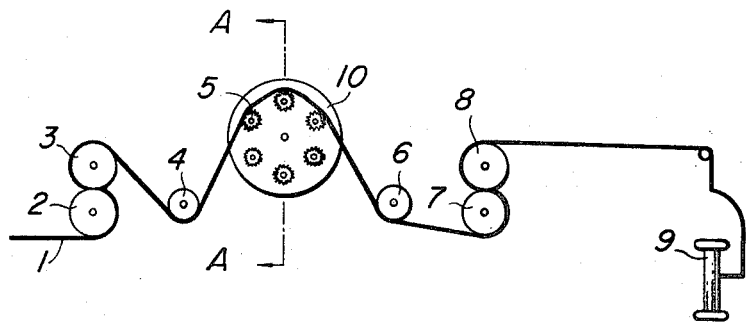
FIG. 2 is a schematic view of another embodiment of the apparatus of the present invention employing a plurality of files assembled in the form of a cage roller.

FIG. 2 shows an apparatus similar to that of FIG. 1 except that a cage-shaped file roller 10 is used in place of the single round bar file 5 shown in FIG. 1.

Figure 3:
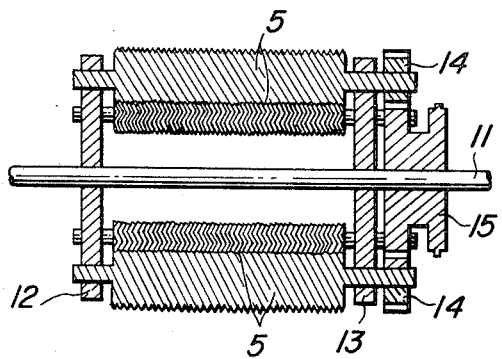
FIG. 3 is an enlarged sectional view of the cage roller of FIG. 2 taken along line A—A.
Figure 4:
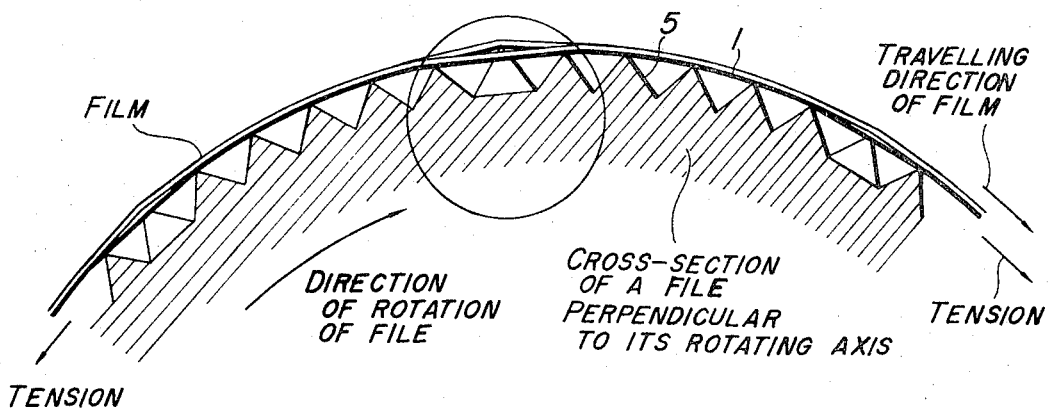
FIG. 4 is a schematic drawing showing the method and means by which an oriented film is fibrillated according to the present invention.
Figure 4A:
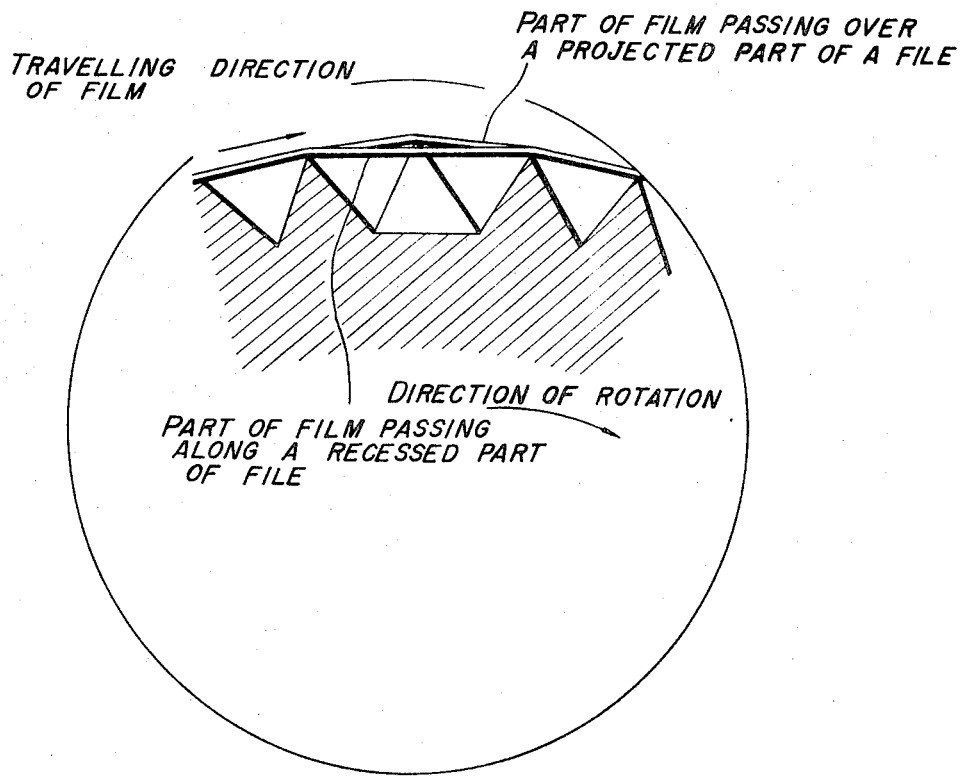
FIG. 4A represents an enlarged view of the circled portion of FIG. 4.
Figure 5:
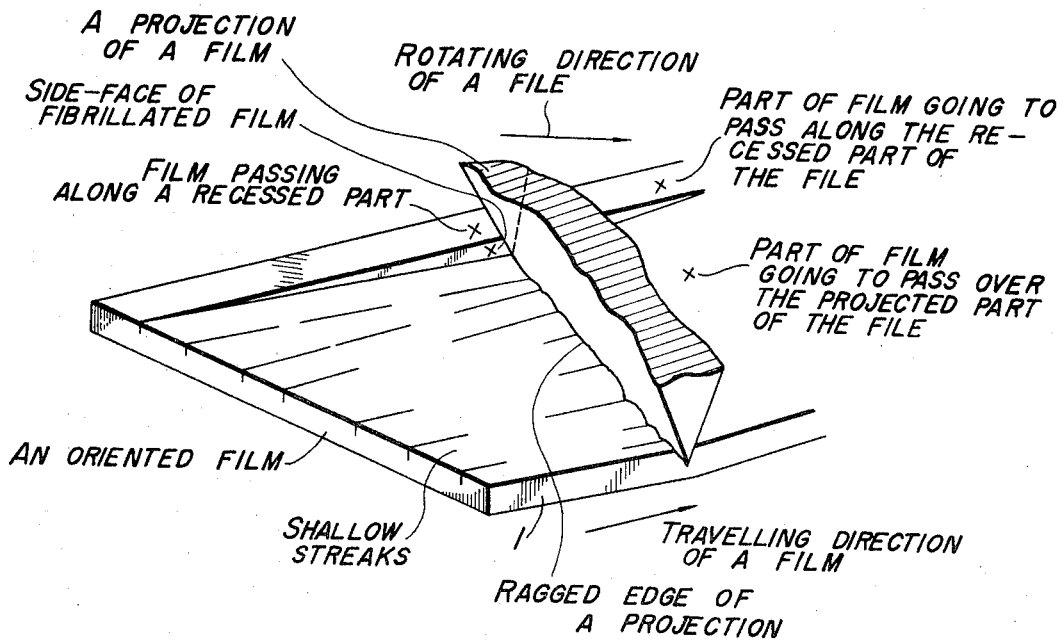
FIGS. 5, 5A and 5B show a diagrammatic representation of how more than one touching of the same portion of the film with the projected portions of the file gradually fibrillates the film into many fibrils.
Figure 5A:
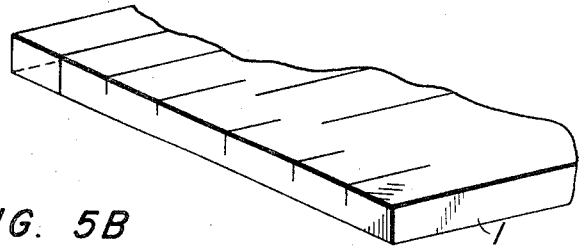
Figure 5B:
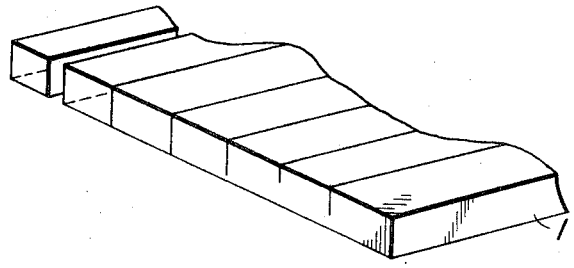

FIG. 3 is a sectional view of the cage-shaped file roller 10 taken along line A—A of FIG. 2. In the cage-shaped file roller 10, a number of round files 5 are arranged between the facing circular plates 12 and 13 which are coaxially attached to the same axis 11. The round bar files are placed at equal intervals around the circumference of each of said plates as shown in FIG. 2. The bar files 5 are in idle engagement with circular plates 12, 13. Gears 14 fixed to each file are engaged in planet position with gear 15 which is freely rotatable around the axis 11 and driven separately from said axis. Thus, each file 5 revolves around axis 11 with the rotation of said axis and at the same time revolves on its own axis with the rotation of gear 15.

Such a file assembly is very useful for the practice of the present invention. In the case of using such a file assembly, if the surface velocity of the cage-shaped files is almost equal to the running speed of the oriented film, the portions of film in contact with the file are fibrillated into fibrils, but the portions of film not in contact with the file are not fibrillated. When the rotational speed of the cage-shaped files varies the running speed of the film, the proportion of non-fibrillated film to fibrillated film becomes small and at least, the film fibrillated by one file contacts the adjacent bar file and the entire film is fibrillated.

Figure 6:
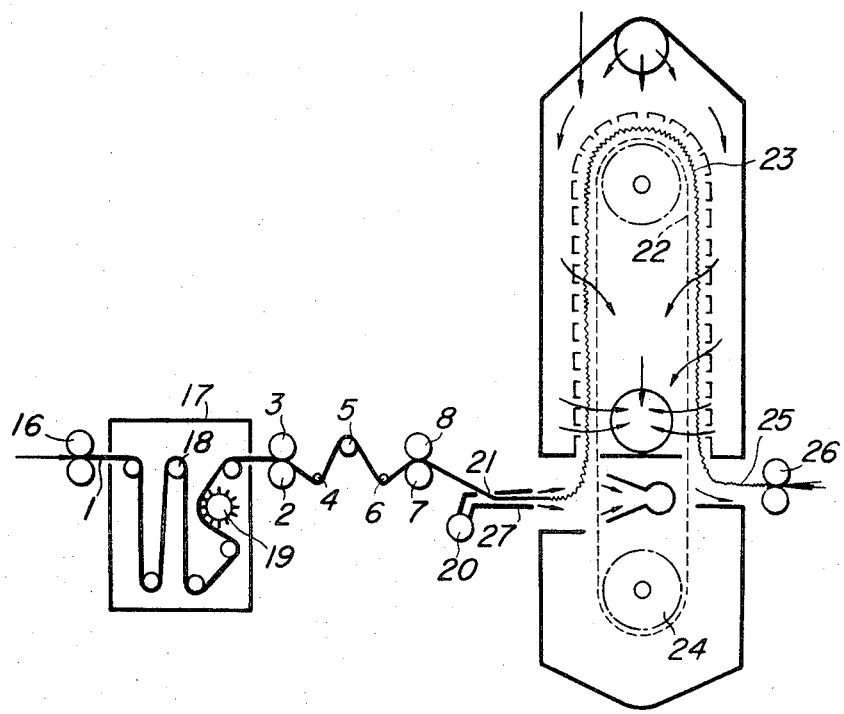
FIGS. 6 and 6A show a combination of the fibrillation and crimping method and apparatus as defined by the present invention.
Figure 6A:
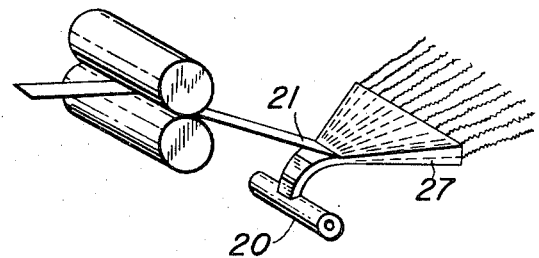

FIG. 6 shows both the fibrillation and crimping method and apparatus as defined by the present invention. Thus, the film tape 1 is fed into a tension device 17 via feed rollers 16, heated for example at a temperature of about 115° C. while moving forward on sending roller 18 and abraded under tension over the revolving sharp edges of a plurality of blades arranged at equal intervals around the periphery of a rotator 19. The thus treated film is then sent to a rotating file 5 by a pair of feed pinch rollers 2 and 3 and fibrillated into many fibrils. By controlling the surface speed of the exit pinch rollers 7 and 8 relative to that of the feed pinch rollers 2 and 3, an appropriate tension is given to the film which is being side-rubbed on the file 5. In this step, the tape speed can be, for example, about 60 meters per minute and the peripheral speed of file 5 can be, for example about 300 meters per minute. The fibrillated fibers 21 are then guided to the entrance of a heating chamber with the help of compressed air supplied to the diffuser 27 via tube 20 from an air supply source (not shown) as shown in greater detail in FIG. 6A.

After completion of the generation of crimps and the heat-setting of said split fibers while traveling within the heating chamber on a conveyor belt 22 driven by a pair of rotating gears 23 and 24, the heat-set crimped fibers 25 are removed from the heating chamber by means of exit rollers 26. When the treatment of the film tape with the rotating edges 19 is omitted and the film is fed directly to the file 5 via feed pinch rollers 2 and 3, the finished product did not possess any crimp thereon due to the lack of an appropriate contraction difference on each side of the film surfaces.

In place of employing the above-described abrading method, any suitable technique may be employed for producing a desired thermal contraction difference on each side of the film. For example, a film may be prepared by utilizing an extrusion die, a lamination technique, coagulation, cooling, and the like.

The present invention may be applied to any polymer film provided that the film may be successively uniaxially oriented. Such polymers include, for example, high density polyethylene, polypropylene, polyvinyl chloride, polyvinyl alcohol, polystyrene, polyacrylonitrile, polyvinylidene chloride and copolymers thereof, poly-4-fluoroethylene, copolymers of 6-fluoropropylene and 4-fluoroethylene and other fluoro-resins, nylon 6, nylon 66, polyethylene terephthalate, polycarbonates, polyurethanes, rubber, cellulose, regenerated cellulose and its derivatives, and the like.

As described hereinbefore, in the method of the present invention, the film surface which is slide-rubbed over the rough surface is given a number of shallow streaks without piercing through the film and at the same time the tension distortion produced in the film between the portions in contact with the projections of the rough surface and the portions moving over the recesses of said surface may cause a kind of shearing stress which in turn results in an effective fibrillation of the oriented film along the boundary lines between the former portions and the latter portions into many fibrils in a direction parallel to the orientation direction of the film. Therefore, the film-fibrillating method and apparatus of the present invention is completely different from the conventional methods, for example, the mechanical cutting of the film with the bristles of a wire brush or cloth as disclosed in Japanese patent publication No. 5,819/1962 and U.S. Pat. No. 2,853,741, or the mere application of physical force to a uniaxially oriented film in its weaker direction, that is, in a direction transverse to that of stretching to aid the splitting thereof as disclosed in Japanese patent publication No. 9,092/1957 and U.S. Pat. No. 2,954,587.

The unique film-fibrillating method and apparatus of the present invention gives a number of advantages when compared to the prior art methods. For example, there is no fear of coiling the split fibers around the bristles of a wire brush. Also, slide-rubbing of the film on an uneven surface according to the present invention produces a number of small streaks in the film, gives an attractive net-work structure in the respective split fibers and is of use even for providing a crimp to the split fibers. Furthermore, in accordance with the present invention it is also possible to employ a considerably smaller size apparatus and obtain a better quality product at a very high operational speed.

The following examples are given merely as being illustrative of the present invention and are not to be considered as limiting.

EXAMPLE 1

Various films made of such polymer as high density polyethylene, polypropylene, polyvinyl chloride are cut longitudinally and stretched uniaxially up to about 6–10 times of their respective original length so as to obtain strips of about 5–8 mm. in width and about 10–20 microns in thickness. In the apparatus shown in FIG. 1 a round bar file having a diameter of 6 mm. and a diagonally patterned fine mesh surface is employed. The surface velocity of the rotating file is controlled so as to be about 3–5 times faster than the running velocity of the film. The running speed of the stretched tape is about 60–100 meters per minute. The contact angle of the tape is 60°. The surface speed of the exit pinch rollers is 5% higher than that of the feed pinch rollers. Under these conditions, the film tape is slide-rubbed over the file surface and fibrillated into fibrils each having a very fine denier and net-work structure. When this is wound around a bobbin after relax-annealed so as to be given twisting thereon, an excellent product fit for use in making industrial yarn is obtained.

EXAMPLE 2

High density polyethylene is extruded through a cicular die and blown into a tubular film having a uniform thickness of 60 microns, and a cold air stream is blown on the outer surface of the film. After cutting the film into strips (20 mm. in width), these tapes are stretched longitudinally up to 9 times their original length in saturated steam at 107° C. to obtain uniaxially oriented films each having a width of 7 mm. and a thickness of 20 microns.

Employing the same apparatus and the same conditions as described in Example 1, the above-said oriented films are fibrillated into fibrils, and thereafter heat treated respectively. When the outer surface of the film is slide-rubbed over the file, the resulted split fiber gave a very good crimping, and when the inner surface is slide-rubbed over the file, very poor crimping is observed on the finished product.

EXAMPLE 3

A conjugated film is made by a wet system from dissolved acrylonitrile polymer and its copolymer (acrylonitrile 92% and methylacrylate 8% by weight), and the thus obtained film is cut into strips and stretched longitudinally up to 14 times the length of their original size in a steam at 110° C.

The oriented film tape is 20 microns in thickness and 6 mm. in width. When a sample tape is heated, the film is curved taking the surface composed of acrylonitrile and methyl-acrylate copolymer inside. The film tape is then slide-rubbed over the file in the same way as described in Example 1, and when the surface composed of the said copolymers is slide-rubbed on the file and thereafter the split fibers are heated, excellent crimped split fibers are obtained.

EXAMPLE 4

High crystalline polypropylene tape is stretched up to 8 times its original length in one direction in saturated steam at 118° C. The uniaxially oriented film heated at 115° C. is abraded under tension over three revolving sharp knife edges arranged at equal intervals around the periphery of a rotator. Upon heating under a tensionless state the thus treated film became curved. The abraded surface of the film, that is, the side of the film which contacted the sharp edges, is slide-rubbed as described in Example 1 to fibrillate the film into fibrils. Thereafter the fibrils are heated to obtain crimped split fibers.

EXAMPLE 5

High crystalline polypropylene is extruded through a T-die at 240° C. at an operational speed of 20 meters per minute and the film thus prepared is cut into strips, each having a thickness of 50 microns and a width of 20 mm. This film tape is then stretched in one direction to 8 times its original length in saturated steam at 118° C. to obtain a uniaxially oriented film with a thickness of 20 microns and a width of 7.5 mm. The film tape 1 is fed into a tension device as shown in FIG. 6 via feeding rollers heated to a temperature of 115° C., moved forward by means of a conveying roller and abraded under tension over a plurality of revolving blades containing sharp edges arranged at equal intervals around the periphery of a rotator. The thus treated tape is then sent in a rotating file by a pair of feed pinch rollers and fibrillated into fibrils. By controlling the surface velocity of the exit pinch rollers relative to that of the feed pinch rollers, an appropriate tension is given to the film slide-rubbing on the file. In this step, the tape speed is 160 meters per minute and the peripheral speed of the file is 300 meters per minute. The thus fibrillated fibers are then guided to the entrance of a heating chamber with the help of compressed air supplied to the diffuser via tubes which communicate with an air supply source, not shown.

After the completion of the generation of crimps and the heat-setting of the fibrillated fibers while traveling within the heating chamber on a conveyor belt driven by a pair of rotating gears, the heat-set crimped fibers are taken out of the heating chamber by means of exit rollers. When the treatment of the film tape with the rotating edges is omitted and the film is fed directly to the file via the fed pinch rollers, the finished product did not possess any crimp thereon due to the lack of an appropriate thermal contraction difference on each side of the film surfaces.

In place of employing the above abrading method, any suitable technique may be employed for producing a desired thermal contraction difference on each side of the film. For example, a conjugated film may be prepared by using an extrusion die. Also, a lamination technique may also be employed. As discussed hereinabove, the present invention may be successively applied to any polymer film provided that the film is uniaxially orientable.

The present invention is quite unique in its working mechanism, operational ease and resulting product as compared with the conventional methods for making split fibers from a polymer film. The present invention has established a new method and apparatus for manufacturing split fibers from an oriented film which is very practical in the commercial production of split fibers.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. A method for manufacturing crimped split fibers from a uniaxially oriented film having different thermal contraction properties on the respective surfaces thereof and obtained from at least one type of fiber-forming polymer which comprises slide-rubbing only the film surface having the higher thermal contraction properties under effective longitudinal tension and in the orientation direction of the film over a rough surface rotating at a peripheral speed different from that of the running speed of the film and having many tiny and rigid projections thereon which do not pierce the film and are not able to split the film by only a single contact with said film, said film contacting in succession a plurality of said projections, thereby fibrillating the film into many fibrils as a result of the shearing stress between film portions passing along the projected portions of the rotating rough surface and those portions passing along the recessed portions of the rotating surface, and heat-treating under non-tension the thus obtained split fibers.

2. The method of claim 1, wherein a double layered film composed of different types of polymers is used as the film, each of said polymers having different thermal contraction properties on the respective sides of said film.

3. The method of claim 1, wherein a film different in molecular orientation on its respective sides is used as the film having different thermal contraction properties on said respective sides of the film.

4. The method of claim 1, wherein the higher thermal contraction property is created on one surface of the film by abrading said surface with at least one sharp edge.

5. The method of claim 1, wherein the fiber-forming polymer is selected from the group consisting of linear high density polyethylene, polypropylene, polyvinyl chloride, polyvinyl alcohol, polyacrylonitrile, polyvinylidene chloride, and copolymers thereof, polystyrene, poly-4-fluoroethylene, copolymers of 6-fluoropropylene and 4-fluoroethylene and other fluoro-resins, nylon 6, nylon 66, polyethylene terephthalate, polycarbonates, polyurethanes, rubber, cellulose, regenerated cellulose and derivatives thereof.

6. The method for manufacturing crimped split fibers from a uniaxially oriented film having different thermal contraction properties on the respective surfaces thereof and obtained from at least one type of fiber-forming polymer which comprises slide-rubbing only the film surface having the higher thermal contraction properties in the oriented direction under an effective longitudinal tension established by a speed difference between the peripheral speeds of inlet and exit pinch rollers and with a contact angle less than 180°, on at least one rough surface rotating at a peripheral speed more than the running speed of the film and having many tiny and rigid projections thereon which do not pierce the film and are not able to split the film by only a single contact of a projected portion with the film and fibrillating the film by successive contact of rows of said projections with the film into many fibrils as a result of the shearing stresses produced between film portions passing on the projected portions of the rotating rough surface and those portions passing along the recessed portions of said rotating surface, and heat-treating under non-tension the thus obtained split fibers.

References Cited

UNITED STATES PATENTS

| | | | |
|---|---|---|---|
| 2,853,741 | 9/1958 | Costa et al. | 264—DIG. 47 |
| 3,181,224 | 5/1965 | Tanner | 264—DIG. 47 |
| 3,273,771 | 9/1966 | Beaumont | 264—DIG. 47 |
| 3,302,501 | 2/1967 | Greene | 264—DIG. 47 |
| 3,358,345 | 12/1967 | Daniel | 28—1 |

ROBERT F. WHITE, Primary Examiner

A. M. SOKAL, Assistant Examiner

U.S. Cl. X.R.

264—282, DIG. 47